United States Patent [19]

Heinen

[11] Patent Number: 4,700,594
[45] Date of Patent: Oct. 20, 1987

[54] MULTI-SPINDLE AUTOMATIC LATHE

[75] Inventor: Walter Heinen, Wesseling, Fed. Rep. of Germany

[73] Assignee: Firma Alfred H. Schütte, Cologne, Fed. Rep. of Germany

[21] Appl. No.: 896,727

[22] Filed: Aug. 15, 1986

[30] Foreign Application Priority Data

Aug. 29, 1985 [DE] Fed. Rep. of Germany ....... 3530860

[51] Int. Cl.$^4$ .............................................. B23B 9/00
[52] U.S. Cl. .......................................... 82/3; 82/28 R
[58] Field of Search .................................. 82/3, 28 R

[56] References Cited

U.S. PATENT DOCUMENTS

| 2,470,871 | 5/1949 | Schwantes et al. | 82/28 R |
|---|---|---|---|
| 3,292,466 | 12/1966 | Jacoby | 82/3 |
| 3,990,133 | 11/1976 | Schalles | 82/3 |
| 4,223,579 | 9/1980 | Stark | 82/3 |
| 4,640,158 | 2/1987 | Link et al. | 82/3 |

FOREIGN PATENT DOCUMENTS

| 2333635 | 2/1974 | Fed. Rep. of Germany | 82/3 |
|---|---|---|---|
| 2351557 | 6/1974 | Fed. Rep. of Germany | |
| 203253 | 10/1983 | Fed. Rep. of Germany | 82/3 |

OTHER PUBLICATIONS

Brochure entitled: Schutte Design: Multi-Spindle Automatics.

Primary Examiner—Nicholas P. Godici
Assistant Examiner—Jerry Kearns
Attorney, Agent, or Firm—Body, Vickers & Daniels

[57] ABSTRACT

A multi-spindle automatic lathe comprises several workpiece spindles driven by separate drive motors through gear units arranged outside the spindle circle. The motors are disposed behind the spindle drum in positions to which the indexing of the spindle drum brings the gear units, so that the gear units can then be coupled to the motors through cone friction clutches comprising parts mounted on the gear units to be displaceable along the axes of the drive output shafts and engage axially non-displaceable parts of the clutches transmitting the drive from said shafts. In the event of axial misalignment each axially non-displaceable clutch part is so connected to its drive output shaft through a cardan shaft that said clutch part can move radially and compensate for the misalignment.

7 Claims, 1 Drawing Figure

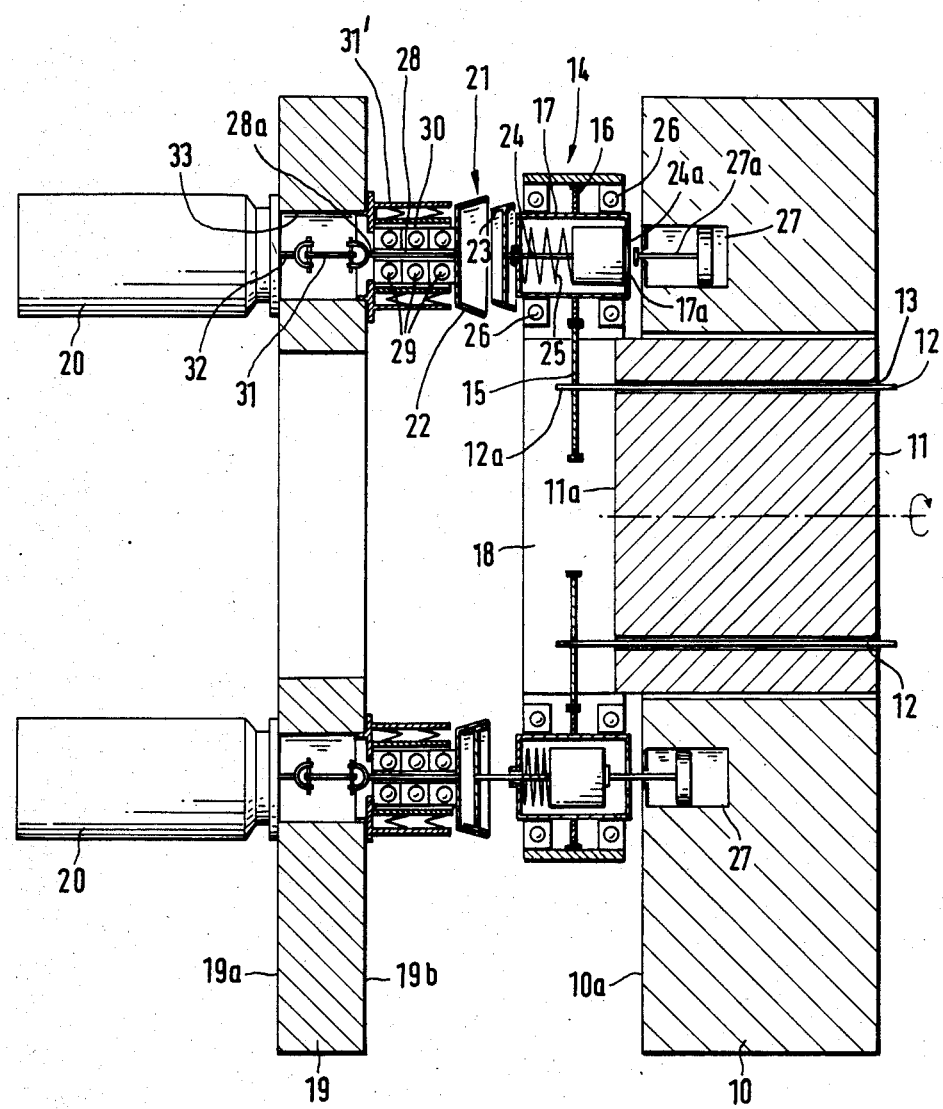

MULTI-SPINDLE AUTOMATIC LATHE

BACKGROUND OF THE INVENTION

The invention relates to a multi-spindle automatic lathe with a number of workpiece spindles which are disposed on the spindle circle of a spindle drum that is rotatably displaceable.

In multi-spindle automatic lathes it is usual to drive the workpiece spindles mounted in the spindle drum from a central drive shaft via a central driving wheel. In the absence of further measures all the spindles have the same speed and if they are to rotate at different speeds it is necessary to provide several central driving wheels of different diameters, which wheels are either arranged on several coaxial hollow shafts or drive the spindles by means of gearwheels and clutches.

In order to be able to drive individual workpiece spindles at different speeds a multi-spindle automatic lathe is known (DE-OS No. 23 51 557) in which separate drives which are arranged in fixed positions behind the spindle drum and, in the working positions of the spindles, can be connected with the spindles by means of clutches which comprise a driving part connected with the output shaft of a drive means and a driven part connected with a specific spindle. The spindles can be connected with their rear ends direct with the output shaft of separate gear units. The gear units have multi-step reduction gears by means of which specific ratios, and therefore only fixed, though differing, speeds of the spindles can be achieved. However, this known construction of automatic lathe particularly suffers from the drawback that the rear ends of the spindle are not free, so that the arrangement cannot be used for automatic bar machines in which the bar material is supplied from the rear through the spindles to the workpiece spindles of hollow form. In use in automatic chucking lathes the clamping units for the chuck cannot be mounted as usual on a spindle end, as the clutch is situated there.

An object of the invention is to provide a multi-spindle automatic lathe in which it is possible to drive all spindles at the speed that is most suitable for the machining operation carried out on them at the particular time and that can also be varied during machining. A further object of the invention is to provide a multi-spindle automatic lathe in which it can be ensured that the rear ends of the spindles remain free for the workpiece feed.

SUMMARY OF THE INVENTION

In a multi-spindle automatic lathe according to the invention, the drives, their output shafts and clutches are arranged outside the spindle circle and the particular part of each clutch that is rotatably displaceable with the spindle drum is connected with a workpiece spindle by means of a gear transmission unit.

This construction has the advantage that the rear ends of the workpiece spindles can be kept free, so that the insertion and feed of workpiece bars into the spindles are not hindered. At the same time it is possible to drive each separate spindle by means of a separate drive.

In this connection it is particularly appropriate for the drives to be speed regulatable driving motors. By this means each spindle not only has a drive kinematically independent of all other machine functions, but also it is possible to have all spindles rotating simultaneously at different spindle speeds, the desired speed being infinitely variable. The speed may then also be modified during the machining process, this being, for example, necessary when a constant cutting speed has to be achieved during facing or transverse turning. Furthermore, it is possible to regulate the speed of each individual spindle depending upon a digitally controlled feed unit, this being required, for example, on thread cutting. Also, it is possible to hold the spindles in specific angular positions, an operation for which special creep speed gears and locking means have hitherto been necessary.

It is especially appropriate for the parts of the clutches that are rotatably displaceable with the spindle drum to be mounted with their gear units in a holder which surrounds the spindle drum at its rear and is connected therewith. By this means the whole of the space behind the spindle drum is kept free, so that the workpiece feed by workpiece bars is not hindered.

Each clutch may have a axially movable part which is firmly mounted on a first clutch shaft constrained to rotate with but being axially displaceable in a hollow gear shaft of the associated gear unit, in the shift positions of the spindle, said axially displaceable part being in axial alignment on one of several clutch actuation devices which are disposed at the same radial distance from the spindle drum axis as the clutches in the indexing positions of the spindles in the headstock. This construction is particularly simple and separates the spindle drum from the actuation devices for the clutches.

The clutches may appropriately be cone friction clutches with an axially non-displaceable part rigidly mounted on a second clutch shaft which is rotatably mounted in a bearing bush to be radially displaceable under load and which is connected by means of a double universal joint coupling or a cardan shaft with the output), shaft of a drive means.

This construction affords the advantage that misalignment between the two clutch parts are compensated. Such misalignment may develop in operation through different heating effects on the machine parts or through varying loadings of the spindle drum.

The bearing bush for the second clutch shaft may be advantageously mounted in a bearing support axially non-displaceable but resiliently held radially. By this means it is possible for the two parts of the cone friction clutch to centre themselves automatically on mutual engagement and for no strains or impermissibly high bearing forces on the clutch parts to arise in operation.

Appropriately, as clutch actuation devices, hydraulic piston-cylinder units may be used, the piston rods of which act upon the first clutch shafts through front openings in the hollow gear shafts. This construction is particularly simple and little prone to breakdown, and permits a precise engagement of the clutch which can be again disengaged by simple resilience before further rotational indexing displacement.

Further features and advantages of the invention will become apparent from the following description and the accompanying drawing in which a preferred embodiment of the invention is explained in greater detail.

BRIEF DESCRIPTION OF THE DRAWING

The single figure of the drawing illustrates, in a diagrammatic partial longitudinal sectional view, the headstock of a multi-spindle automatic lathe according to the invention and the drive gears disposed behind it for the workpiece spindles. Two of the workpiece spindles are shown, the lower one being coupled with its drive and the upper one being uncoupled from its drive.

DESCRIPTION OF THE PREFERRED EMBODIMENT

Mounted in a rotatably displaceable manner in the headstock 10 of a multi-spindle automatic lathe is a spindle drum 11 in which several workpiece spindles 12 are disposed, distributed around spindle circle 13. The spindles 12 are preferably hollow so that they may be able to take up bar-form workpieces, not shown in greater detail here, which are introduced in a per se known manner into the spindles 12 at the rear end 12a.

Each workpiece spindle 12 has associated with it a gear transmission unit 14 which consists of two gear wheels 15 and 16 which mesh one with the other, and of which one gear wheel 15 is mounted on the spindle 12, and the other gear wheel 16 is mounted on a hollow gear shaft 17. All the gear units 14 are mounted in a circle in a support 18 which surrounds the spindle drum 11 at the back 11a of the drum and has a greater diameter than the drum. As will be seen from the drawing the gear wheels 16 are situated radially outside the spindle drum 11.

Located at some distance behind the headstock is a motor stand 19, anchored in a manner not shown in greater detail here in the motor frame (not shown) The motor stand has at the rear 19a as many drive motors 20 as there are workpiece spindles 12 These drive motors 20, in the indexing or working positions of the spindles 12, are arranged on a circle in such a manner that they are disposed opposite the gear units 14 when the latter are in the indexing positions corresponding to the working positions of the spindles 12

In their indexing positions shown in the drawing each drive motor 20 can be coupled to a transmission gear unit 14 Provided for this purpose are clutches 21 which are designed as cone friction clutches, each with an axially fixed conical shell 22 which is connected to a respective drive motor 20, and with an axially movable cone 23 which is connected to the gear unit 14. The axially movable part 23 is mounted in a fixed position on a first clutch shaft 24 which is itself axially movably mounted in a hollow gear shaft 17 and is under the action of a compression spring 25 which tends to urge the axially movable part 23 out of the axially fixed part 22. The hollow shaft 17, which supports the drive gearwheel 16 and is rotatably mounted in the support 18 with bearings 26, is non-rotatably connected to the first clutch shaft 24, a condition which may be achieved, for example, through a splined formation on said shafts. Oppositely placed to the drive motors 20 and arranged in the headstock 10 are clutch actuation devices 27 which are constituted by hydraulic piston-cylinder units the piston rods 27a of which protrude out of rear end wall 10a of the headstock 10 and are able to act upon the end faces 24a of the first clutch shafts 24 through openings 17a in the hollow shafts 17.

The axially fixed clutch parts 22 form part of their respective drive motors 20. They are rigidly secured on second clutch shafts 28 which are rotatably mounted on bearings 29 in bearing bushes 30. Each bearing bush is axially fixed, but is radially displaceably housed in a resilient manner in a bearing support 31' which surrounds the bearing bush 30 with a spacing and is fixed on the front side 19b of the motor stand 19. The second clutch shaft 28 is connected at its rear end 28a by means of a cardan shaft 31 with the output shaft 32 of the drive motor 20, the cardan shaft, which may also be an intermediate shaft with two universal joints, passing through a recess 33 in the motor stand 19.

When the spindle drum 11 is indexed forwards about its rotary axis in order to bring the workpiece spindles 12 to their next appropriate working position, the individual parts are in the position shown in the upper part of the drawing, in which the clutches 21 are disengaged and the pistons of the piston-cylinder units 27 are in their retracted position. During indexing, the support 18 rotates with the spindle drum 11 so that each gear unit 14 comes into alignment with the next drive motor 20, while the spindles 12 reach their new working positions. As a result of the actuation of the clutch unit 27 the piston rods 27a are urged against the first clutch shafts 24 so that these are displaced against the action of their springs 25, axially to the left in the drawing, and their clutch cones 23 engage with the conical shells 22 of the axially opposite drive units.

In the event of inaccuracies of alignment between the axes of a pair of parts 22 and 23 of a clutch, these clutch parts are centred automatically in that the axially movable part 23 displaces the axially fixed part 22 radially until the two parts are in mutual engagement and with their conical circumferential surfaces applied firmly one against the other. Such a radial movement is possible because the second clutch shaft 28 of the axially fixed clutch part 22 can move radially against the action of the springs arranged between the bearing bush 30 and the bearing support 31, and because the cardan shaft connecting the clutch shaft 28 with the output shaft 32 of the motor drive compensates for the eccentricity between the shafts 28 and 32.

With the clutch parts 22, 23 engaged, each workpiece spindle 12 can be driven by the motor drive associated with the clutch part 22, independently of the drive of the other workpiece spindles, at the speed most appropriate to it, via the clutch 21 and the gear unit 14. It is also possible to vary the speed of a particular drive motor 20 during machining, or even to stop the drive motor.

It will be seen from the drawing that the rear ends 12a of the workpiece spindles are completely free so that they can be loaded with workpiece bars which are not impeded either in the machining or on indexing the spindle drum 11, as the space behind the spindle drum is completely free.

Further features of the embodiment of the multi-spindle automatic lathe are not described or illustrated since the construction can be conventional, as will be understood by the person skilled in the art.

The invention is not restricted to the example of construction that has been represented and described, as many modifications and additions are possible without departing from the scope of the invention. For example, it is possible to use other devices for engaging and disengaging the clutches, and it is also possible to design the clutches themselves in another way.

I claim:

1. In a multi-spindle automatic lathe; a spindle drum; rotary support means on which said drum is rotatably displaceable; a series of spindles mounted on the drum and adapted to receive workpieces, said spindles being disposed on a spindle circle of the drum to be indexed between working positions by said rotary displacement of the drum; a series of separate drive means in stationary positions behind the spindle drum, said drive means having output shafts; separate disengagageable clutch means between said output shafts and the spindles for connecting the drive means to the spindles when they are in their working positions, said clutch means each comprising a driving part connected to an output shaft, and a driven part connected to a respective spindle and rotatably displaceable with the spindle drum; clutch actuating means for engaging and disengaging said clutch means; said drive means and said clutch means both being disposed radially outwards of said spindle circle; and, gear transmission means carried on said drum for connecting said clutch means driven parts to respective spindles, whereby access is provided for said spindles to receive workpieces at the rear of said drum.

2. An automatic lathe according to claim 1, wherein the drive means comprise variable-speed drive means.

3. An automatic lathe according to claim 1, comprising a support, gearwheels of said gear transmission means and the rotatably displaceable driven parts being mounted on said support, said support surrounding the spindle drum at its rear and being connected thereto.

4. In a multi-spindle automatic lathe; a spindle drum; rotary support means on which said drum is rotatably displaceable; a series of spindles mounted on the drum and being disposed on a spindle circle of the drum to be indexed between working positions by said rotary displacement of the drum; a series of separate drive means in stationary positions behind the spindle drum, said drive means having output shafts; separate disengageable clutch means between said output shafts and the spindles for connecting the drive means to the spindles when they are in their working positions, said clutch means each comprising a driving part connected to an output shaft and a driven part connected to a respective spindle and rotatably displaceable with the spindle drum; clutch actuating means for engaging and disengaging said clutch means; said drive means and said clutch means both being disposed radially outwards of said spindle circle; gear transmission means connecting said clutch means driven parts to respective spindles; said gear transmission means comprising, for each spindle, a hollow gear shaft; one of said clutch parts of the associated clutch means being rotationally fixed to and axially within said hollow gear shaft; the associated spindle of said gear transmission means having a working position in which said driving and driven clutch parts are engageable and disengageable by said relative axial movement, and wherein said clutch actuating means comprises a series of clutch actuation devices disposed at the same radial distance from the spindle drum axis as the clutch means; and, the associated hollow gear shaft being in axial alignment with a respective clutch actuation device when its spindle is in a working position.

5. An automatic lathe according to claim 4, wherein the clutch actuation devices are piston-cylinder units having piston rods for said axial displacement of a clutch part, the hollow gear shafts having end openings through which said piston rods operate.

6. In a multi-spindle automatic lathe; a spindle drum; rotary support means on which said drum is rotatably displaceable; a series of spindles mounted on the drum and being disposed on a spindle circle of the drum to be indexed between working positions by said rotary displacement of the drum; a series of separate drive means in stationary positions behind the spindle drum, said drive means having output shafts; separate disengageable clutch means between said output shafts and the spindles for connecting the drive means to the spindles when they are in their working positions, said clutch means each comprising a driving part connected to an output shaft and a driven part connected to a respective spindle and rotatably displaceable with the spindle drum; clutch actuating means for engaging and disengaging said clutch means; said drive means and said clutch means both being disposed radially outwards of said spindle circle; gear transmission means connecting said clutch means driven parts to respective spindles; said clutch means comprising cone friction clutches, each having an axially fixed part, a clutch shaft on which said fixed part is rigidly secured, and bearing means for said shaft in which the shaft is rotatably mounted, said bearing means being radially movable under load, intermediate shafts connecting said clutch shafts to drive means comprising universal joint means for accommodation of radial movement of the said clutch shafts within their bearing means.

7. An automatic lathe according to claim 6, wherein a bearing support is provided for the bearing means of each said clutch shaft, said bearing means being mounted axially fixed and radially displaceable in their bearing supports, and resilient means acting on said bearing means for urging them to a predetermined radial position relative to the spindle drum.

* * * * *